United States Patent [19]

Allen et al.

[11] Patent Number: 4,579,363

[45] Date of Patent: Apr. 1, 1986

[54] EASILY RELEASABLE MOUNTING FOR SUPPORTING POWERED EQUIPMENT BETWEEN A TRACTOR AND TRAILER

[75] Inventors: James R. Allen, Bettendorf, Iowa; Jack C. Wiley, Moline, Ill.

[73] Assignee: Deere & Company, Moline, Ill.

[21] Appl. No.: 594,965

[22] Filed: Mar. 29, 1984

[51] Int. Cl.$^4$ ............................................. B62D 53/00
[52] U.S. Cl. ................................. 280/474; 172/324; 172/679; 280/476 R; 280/504
[58] Field of Search ............... 280/420, 423 R, 423 A, 280/415 R, 415 A, 418, 400, 405 R, 405 B, 406 R, 406 A, 407, 474, 504, 477, 476; 180/14.1, 14.2, 14.3, 14.4, 11, 12, 13; 172/677, 679, 324; D12/162

[56] References Cited

U.S. PATENT DOCUMENTS

| | | | |
|---|---|---|---|
| 2,360,902 | 10/1944 | Simmons | 280/406 R |
| 2,515,991 | 7/1950 | Dufour | 180/14.1 |
| 3,612,575 | 10/1971 | Stewart | 280/474 |
| 3,645,560 | 2/1972 | Steele | 280/406 A X |

FOREIGN PATENT DOCUMENTS

| | | | |
|---|---|---|---|
| 488970 | 1/1930 | Fed. Rep. of Germany | 280/474 |
| 603805 | 6/1948 | United Kingdom | 180/13 |

Primary Examiner—David M. Mitchell
Assistant Examiner—Mitchell J. Hill

[57] ABSTRACT

A powered vacuum is mounted between a tractor carrying a rotary mower and a trailer carrying a receptacle for moving material from the mower discharge to the receptacle. A mounting frame carries a blower which may include either an internal combustion engine or gearbox and a fan coupled directly to the engine or gearbox. The mounting frame is mounted to the tractor by connections defining three coplanar ball joints located to permit relative pitch and roll between the tractor and trailer. The mounting frame is easily releasably secured to the tongue of the trailer. The mounting frame is articulated between its opposite ends for movement about a tight vertical axis. The mounting frame, in one form, defines a receptacle for receiving a support member of a wheeled dolly for supporting the powered vacuum when the mounting frame is disconnected from the tractor and trailer, and in another form includes retractable wheels which may be selectively placed in an operative condition for supporting the vacuum.

10 Claims, 9 Drawing Figures

EASILY RELEASABLE MOUNTING FOR SUPPORTING POWERED EQUIPMENT BETWEEN A TRACTOR AND TRAILER

BACKGROUND OF THE INVENTION

The present invention relates to the combination of powered equipment with a tractor and trailer and more particularly relates to mountings for supporting such equipment on tractor-trailer combinations.

Powered equipment is often used together with a tractor and trailer for working on and/or loading material for transport by the trailer or for working on material being transported in the trailer. This equipment may be powered from the tractor PTO or it may include its own power source such as a gasoline engine, for example. Examples of such equipment are powered vacuums, chippers, log splitters and portable generators.

This powered equipment is normally mounted either to the trailer tongue or to the rear end of the tractor. Although many users desire to use their tractor-trailer combination or their tractor alone for doing tasks other than those requiring the powered equipment, current powered equipment mountings discourage such use since they all make it difficult and time-consuming for one person to mount and dismount powered equipment to and from the tractor or trailer tongue. In addition, tractor mounted installation adversely affects tractor weight distribution and handling.

SUMMARY OF THE INVENTION

According to the present invention, there is provided an improved mounting for connecting powered equipment between a tractor and trailer.

A broad object of the invention is to provide a mounting permitting one person to easily and quickly mount and dismount powered equipment to and from a tractor-trailer combination in order to enhance the multi-use attributes of the tractor and the trailer.

Another broad object of the invention is to provide a mounting for powered equipment which enhances the maneuverability and weight distribution of the tractor-trailer system.

A further object of the invention is to provide a powered equipment mounting which allows easy storability of the equipment when it is disconnected from the tractor and trailer.

A more specific object of the invention is to provide a mounting including a frame for carrying powered equipment and having its forward end connected to the tractor so as to primarily permit relative pitch and roll action between the tractor and frame, having its rearward end releasably connected to the trailer tongue so as to form a rigid extension of the tongue and having a vertical pivot joint between its opposite ends for permitting yaw movement of the tractor relative to the trailer.

Yet a more specific object of the invention is to provide a powered equipment mounting which includes a frame releasably coupled to a tractor so as to define three coplanar, spherical ball joints with two of the joints being located on the tractor in transverse alignment with each other.

Another specific object of the invention is to provide a powered equipment mounting including either a frame adapted for receiving a support structure of a wheeled dolly or a frame carrying retractable support wheels for permitting the powered equipment to be rolled into storage once disconnected from the tractor and trailer.

These and other objects, features and advantages of the present invention will become apparent to those skilled in the art from the description which follows and from the drawings.

DESCRIPTION OF THE PREFERRED EMBODIMENT

Figure 1:
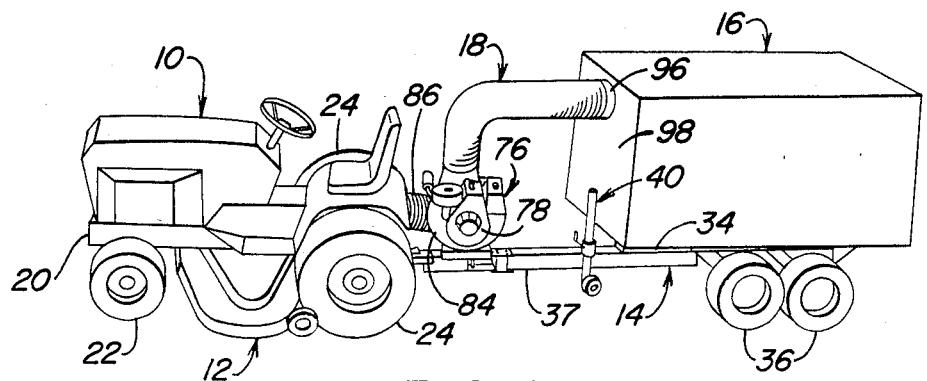
FIG. 1 is a left side perspective view of a tractor and trailer having a powered vacuum mounted thereto in accordance with the principles of the present invention.
Figure 2:
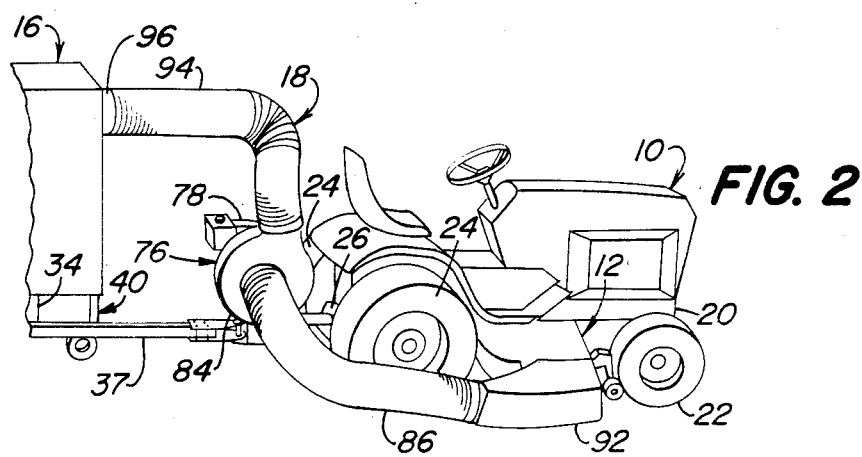
FIG. 2 is a right side perspective view of the tractor, trailer and powered vacuum shown in FIG. 1.

Referring now to the drawings, therein is shown the combination of a lawn and garden tractor 10 carrying a belly-mounted mower 12, a trailer 14 carrying a receptacle 16, and a powered vacuum 18 for conveying grass clippings and other debris from a discharge opening of the mower to the receptacle. It is here noted that the powered vacuum 18 is merely exemplary of various powered equipment which would be particularly useful in conjunction with the tractor 10 and trailer 14.

The tractor 10 includes a main frame 20 supported on a pair of steerable front wheels 22 and a pair of driven rear wheels 24. As can best be seen in FIGS. 4 and 5, a drawbar assembly 26 is fixed to the rear of the frame 20 at a location between the rear wheels 24. The drawbar assembly 26 includes a horizontal hitch plate 28 provided with a vertical hole 30 having a purpose set forth below. Spaced ahead of the hole 30 is a trailer hitch ball 32 and spaced rightwardly from the ball 32 is a pair of laterally spaced gussets 33 provided with aligned horizontal holes which lie on an axis Y which intersects the center of the ball 32, the purpose of the ball and horizontal holes being for establishing two points of connection of the powered vacuum 18 with the tractor as set forth below in more detail.

The trailer 14 could be of any well-known construction but is here shown as including a generally horizontal frame 34 supported at opposite sides by wheels 36. Joined to the bottom of the frame 34 and projecting forwardly therefrom is a tongue 37 of rectangular cross section. The tongue 37 terminates forwardly in a clevis 38. When the tractor and trailer are used together without powered equipment, the trailer is connected to the tractor drawbar assembly 26 by a hitch pin received through aligned holes in the clevis 38 and the hole 30 in the plate 28. A vertically adjustable jack stand 40 is mounted to the tongue 37 adjacent the receptacle 16 for supporting the tongue above the ground when the tractor 10 is disconnected from the powered vacuum 18, in a manner described below.

Figure 3:
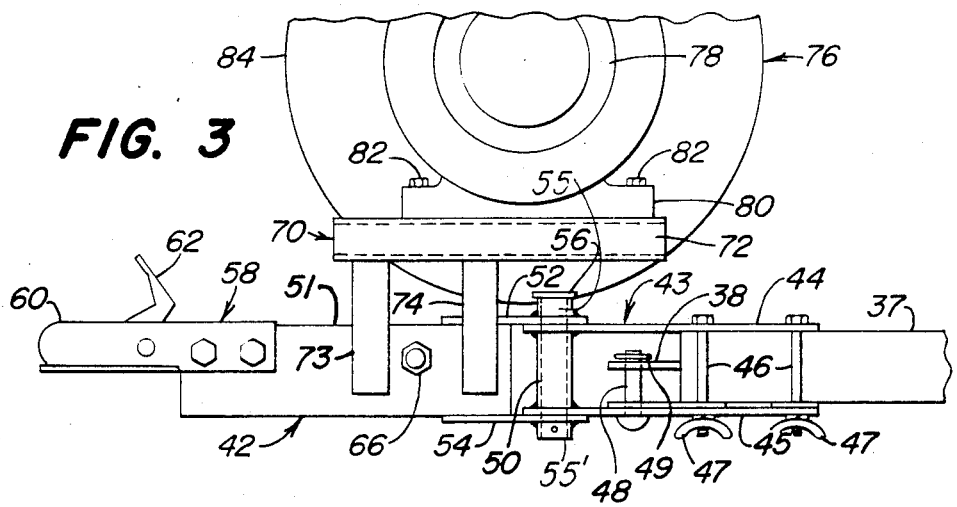
FIG. 3 is a left side elevational view showing the powered vacuum mounting and the rigid connection of the mounting to the forward end of the trailer tongue.
Figure 4:
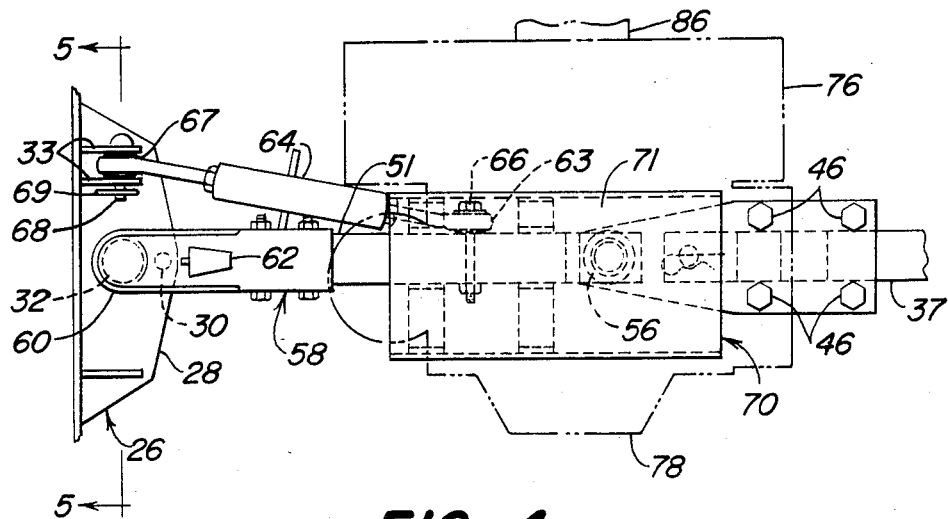
FIG. 4 is a top plan view of the mounting shown in FIG. 3 but showing the vacuum in phantom and, in addition, showing the connection of the mounting to the tractor drawbar.
Figure 5:
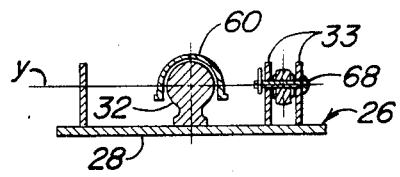
FIG. 5 is a sectional view taken along line 5—5 of FIG. 4.
Figure 6:
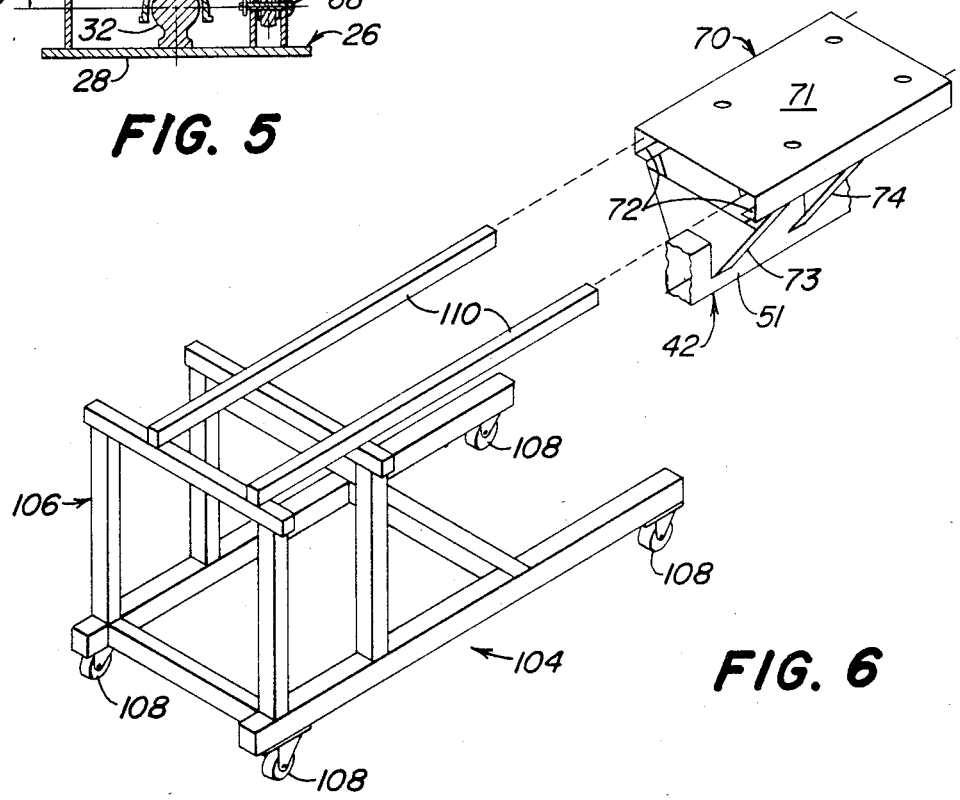
FIG. 6 is a left side perspective view showing a portion of the powered vacuum mounting frame and a wheeled dolly located for being rolled into supporting engagement with the frame.

The powered vacuum 18 includes a mounting frame 42 which may be of various construction and configuration so long as it features a rear end section which is easily releasably connected to the tongue 37 for forming a rigid extension of the latter, a tight or revolute pivot joint between its opposite ends permitting relative yaw between the tractor and trailer, and an easily releasable connection for securing the frame to the tractor and defining three spherical joints located in a common plane so as to primarily permit relative pitch and roll motion between the tractor and trailer. The construction of the frame 42 used here is best illustrated in FIGS. 3-5, and comprises a rear end section 43 defined by upper and lower plates 44 and 45, respectively having rear end portions lying flat against top and bottom surfaces of the forward end portion of the tongue 37. The plates 44 and 45 are wider than the tongue 37 and extending downwardly through four aligned sets of holes provided in the plates, two sets on each side of the tongue, are bolts 46 having wing nuts 47 threaded thereon so as to clamp the plates against the tongue. A hole in the lower plate 45 is aligned with the holes of the clevis 38 and a pin 48 is received through the holes and held in place by a spring clip 49. The pin 48 establishes a positive connection between the tongue 37 and frame 42 whereby it serves to at least share with the clamped plates 44 and 45 the transferring of pulling forces from the frame to the trailer. The forward ends of the plates 44 and 45 are provided with vertically aligned holes and welded to the plates in alignment with the holes is a cylindrical tube 50. The frame 42 further includes a tubular section 51 of rectangular cross section and having straps 52 and 54, respectively welded to upper and lower surfaces of the rear thereof, the straps sandwiching the plates 44 and 45 and containing holes aligned with the tube 50. Also aligned with and cooperating with the tube 50 to form a sleeve means are short tubes 55 and 55' which are respectively welded to the straps 52 and 54. A pivot shaft or pin 56 having an enlarged upper end is snugly received in the sleeve means cooperates therewith to define a vertical pivot joint which closely adheres to the kinematic definition of a revolute joint, i.e., it substantially provides a unique axis of relative rotation between tubular section 51 and the end section 43 of the frame 42. A hitch ball receptacle assembly 58 has a channel-shaped rear portion received over and bolted to the upper front portion of the tubular section 51.

The frame 42 is joined to the tractor drawbar assembly 26 by connections which define three spherical joints located in a common plane for achieving relative roll and pitch between the tractor and trailer. Specifically, the forward end of the ball receptacle assembly 58 includes a ball receptacle 60 received on the hitch ball 32 so as to define a first of the three spherical joints and is releasably captured on the ball 32 by a latch mechanism including a handle 62. Second and third spherical joints are respectively defined by a ball joint 63 forming the rear end of a link 64 and received on the right end of a bolt 66, projecting horizontally through the frame section 51 at a location behind the assembly 58, and by a ball joint 67 forming the forward end of the link 64 and held between the gussets 33 of the drawbar assembly 26 by a pin 68 located on a horizontal transverse pitch axis Y and held in place by an easily releasable spring clip 69. The link 64 is here shown in the form of a turnbuckle so as to be easily length adjustable so as to accommodate for manufacturing tolerances. It is here noted that the ball joint 63 is located rightwardly of a center line passing through the hitch ball 32 and the pivot bolt 56 only as a matter of convenience since ideally it should be located on the center line so as to eliminate any yaw occurring about the ball 32 when relative roll occurs between the tractor and trailer. However, the amount of yaw which does occur during roll due to the placement of the ball joint 63 is inconsequential.

The mounting frame 42 also includes a member 70 having a horizontal, rectangular central portion 71 having L-shaped legs 72 joined to the opposite sides thereof. Front and rear gussets 73 and 74 are welded between the member 70 and the frame section 51.

The powered vacuum 18 further comprises a blower 76 including an engine 78 (FIGS. 1-4) having a base 80 fastened to central portion 71 of the member 70 by bolts 82. The blower 76 includes a cylindrical fan housing 84 in which a fan (not shown) is located and connected for being driven directly by the engine 78. A first flexible hose 86 has its rear end coupled to an inlet tube projecting axially from the housing 84. The forward end of the hose 86 is coupled to a tubular outlet (not shown) of a discharge chute 92 which is attached to the right side of the blade housing of the mower 12 by a known connection permitting the chute to be disconnected merely by lifting up on the chute. A second flexible hose 94 has its forward end attached to a tubular outlet (not shown) extending tangentially from the fan housing 84. The rearward end of the hose 94 is attached to a tubular inlet 96 fixed to a forward wall 98 of the receptacle 16. Known strap-type clamps (not shown) having easily releasable over center clasps may be used to secure the ends of the hoses 86 and 94 in place.

Figure 7:
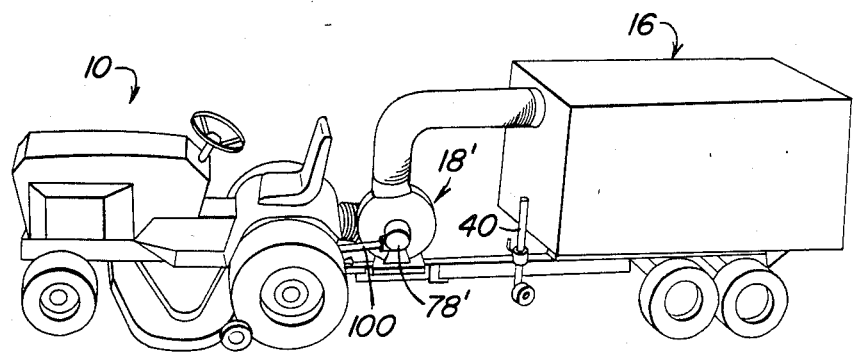
FIG. 7 is a view like FIG. 1 but showing a PTO drive for the powered vacuum.

Referring now to FIG. 7, there is shown a powered vacuum 18' which is just like the above-described vacuum 18 except that instead of an engine 78 it employs a right angle gearbox 78' having an output coupled to the blower fan and an input coupled to the rearward end of a drive shaft 100 having its forward end coupled to a power takeoff shaft (not shown) of the tractor 10. Although not shown here, the shaft 100 would include appropriate U- and slip joint drive connections to accommodate for any misalignment of the gearbox input and the tractor power takeoff shaft.

A dolly 104 comprising an open framework 106 supported on castered wheels 108 can be used for supporting the powered vacuum 18 or 18' and moving it into storage after it is disconnected from the tractor 10 and the trailer 14. The frame 106 includes a pair of transversely spaced, fore-and-aft extending, tubular members 110 which are cantilevered and dimensioned and located for being bordered by the L-shaped legs 72 of the member 70. Thus, upon driving the tractor 10 out of the way after lowering the trailer jack stand 40 and disconnecting the frame 42 from the tractor 10 and the hose 86 from the mower 12, the dolly 104 may be rolled in place with the members 110 located beside the legs 72 for engaging the portion 71 and thereby supporting most of the weight of the vacuum 18 or 18' once the jack stand 40 is lowered. The frame 42 may then be disconnected from the trailer tongue 37 and the hose 94 disconnected from the trailer so as to permit the dolly to be rolled to place the vacuum 18 or 18' in a place of storage.

Figure 8:
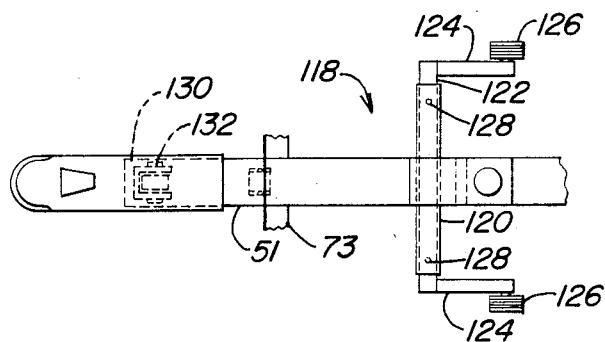
FIGS 8 and 9 are views like FIGS. 3 and 4 but showing a set of retractable wheels forming part of the mounting frame of the powered vacuum and with portions of the frame being broken away for clarity.
Figure 9:
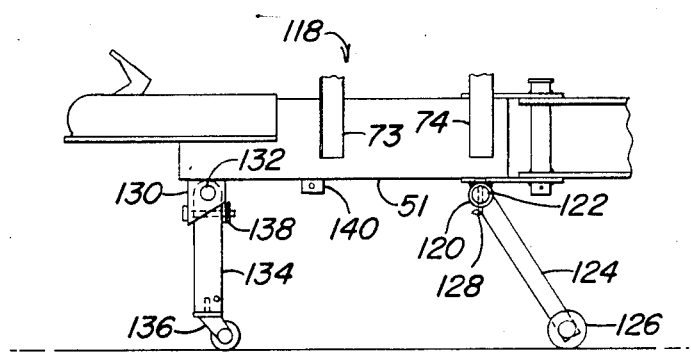

Referring now to FIGS. 8 and 9, there is shown a frame 118 which is just like the frame 42 except that it has three retractable wheels which may be used for supporting the vacuum 18 or 18' in lieu of using a separate dolly. Using like reference numerals to indicate parts which are like those used above in describing the frame 42, the frame 118 includes a tubular section 51 having a transverse, horizontal tube 120 welded thereto at a rear underside location. A shaft 122 is received in the tube 120 and secured to the opposite ends of the shaft is a pair of arms 124 having a pair of wheels 126 respectively mounted to their lower ends. The wheels 126 are shown held in their operative position by means of a pair of pins 128 inserted through holes provided in the tube 120 and the shaft 122. Alternate holes are appropriately placed in the shaft 122 for receiving the pins 128 for holding the wheels in a retracted position wherein they are located at opposite sides of the frame section 51. A bracket 130 is welded to a front underside location of the frame section 51 and vertically pivotally mounted to the bracket, as by a pin 132, is a leg 134 having a castered wheel 136 mounted to the lower end thereof. The leg 134 is releasably held in its illustrated operative position by a pin 138 which may be withdrawn to permit the leg to be pivoted to a stored position beneath the frame section 51, the pin 138 then being inserted through aligned holes in the leg and a bracket 140 to secure the leg in place.

The operation of the tractor 10 and trailer 14 in combination with the powered vacuum 18 or 18' is briefly as follows: Assuming the tractor 10 to be traversing uneven terrain and travelling more or less a straight course, relative pitch between the tractor and trailer will occur about the axis Y and relative roll will occur as permitted by the three coplanar spherical joints defined at the hitch ball 32 and ball joints 63 and 67. Because the joint 63 is offset a small amount from a line passing through the ball 32 at the pivot shaft 56, a negligible amount of yaw will occur during roll. The majority of yaw will occur about the pivot shaft 56 when the tractor 10 is steered one way or the other from the straight course. The location of the pivot shaft 56 rearwardly of the tractor 10 results in the trailer 14 being able to closely follow the path taken by the tractor 10 so that when the tractor is driven closely about the base of a tree, for example, the trailer follows without colliding with the tree. It is also noted that the vertical portion of the hose 94 is close to the axis of the pivot shaft 56 and therefore the hose does not become excessively twisted during steering operations. It is further to be noted that the tractor 10 may be steered sharply to the right without any interference between the hose 86 and the trailer 14 since the bottom of the receptacle 16 is high enough to permit the hose to pass therebeneath.

The ease with which the powered vacuum 18 or 18' may be disconnected from the tractor 10 and trailer 14 is clearly evident from the description set forth above. Suffice it to say, that one person, without the use of tools, can quickly and easily disconnect the chute 92 from the mower 12, disconnect the tractor from the powered vacuum frame 42, move the tractor out of the way, support the frame 42 on either a portable dolly or its own retractable wheels, and then disconnect the frame 42 from the trailer and roll the powered vacuum into a place of storage. The tractor may then be used alone or hitched to the trailer by dropping a pin through the clevis 38 and drawbar hole 30.

We claim:

1. A mounting for powered equipment, comprising an elongate mounting frame adapted for supporting powered equipment and having a rear end defined by a first connection means, adapted for releasably clamping the frame to a trailer tongue of rectangular cross section and having a clevis at its forward end, and a forward end defined by a second connection means adapted for releasably securing the frame to a tractor hitch; said first connection means including upper and lower plates respectively adapted for engaging upper and lower surfaces of the trailer tongue and each plate being sized to extend beyond opposite sides of the tongue; and bolts extending through said plates at locations adapted for positioning at opposite sides of the tongue whereby their tightening will clamp the plates to the tongue.

2. The mounting defined in claim 1 wherein said first connection means includes a fastener extending through one of the plates and adapted for reception in the tongue clevis.

3. The mounting defined in claim 1 wherein said mounting frame includes a section formed from a tube of rectangular cross section; said tube having a clevis located at its rear end; said clevis and said upper and lower plates carrying axially aligned cylindrical tubes; and a pivot shaft being received in the tubes so as to define a revolute joint to thereby make said mounting frame articulated.

4. The mounting defined in claim 1 wherein said mounting frame defines a receptacle for receiving part of a dolly for supporting the mounting frame when the mounting frame is disconnected from a towing tractor and the trailer.

5. In a combination including a tractor having a drawbar provided with a hitch ball, a trailer having a tongue coupled for being towed by the tractor and a powered device carried by the tractor-trailer combination, the improvement comprising: a mounting frame carrying said powered device and including a hitch ball receptacle at its forward end received on said hitch ball; said drawbar further including a pin located on a horizontal transverse axis passing through the center of the hitch ball; a yaw limiting link having a forward end defined by a first ball connection releasably received on said pin and having a rearward end defined by a second ball connection mounted to said mounting frame at a location rearwardly of said ball receptacle; said hitch ball and first and second ball connections being coplanar; a vertical axis of articulation being established in said mounting frame rearwardly of the second ball connection; and releasable connection means coupling a rear portion of said frame to a forward end portion of said tongue.

6. The combination defined in claim 5 wherein said yaw limiting link is in the form of a turnbuckle.

7. The combination defined in claim 5 wherein said trailer tongue is rectangular in cross section; said mounting frame including upper and lower elongate plates respectively engaging upper and lower surfaces of said tongue at the forward end portion of the latter and forming a portion of said releasable connection means; and said releasable connection means further including fasteners holding said plates in clamped engagement with said tongue.

8. The combination defined in claim 5 wherein said mounting frame includes a forward section separate from said plates and having a rearward end defined by a clevis; and revolute joint means defined in part by and including means coupling said clevis and said plates and disposed for establishing said vertical axis of articulation between opposite ends of the mounting frame.

9. The combination defined in claim 5 wherein said mounting frame includes receptacle means adapted for receiving support structure of a dolly for supporting the mounting frame and the powered device carried thereby when the mounting frame is disconnected from the tractor and trailer.

10. The combination defined in claim 5 wherein said mounting frame includes retractable wheels for selectively supporting the mounting frame and the powered device carried thereby when the mounting frame is disconnected from the tractor and trailer.

* * * * *